(12) United States Patent
Reardon

(10) Patent No.: US 7,346,538 B2
(45) Date of Patent: Mar. 18, 2008

(54) SYSTEM AND METHOD FOR BUSINESS ANALYSIS AND PLANNING

(75) Inventor: Kevin J. Reardon, Riverside, CT (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 09/933,602

(22) Filed: Aug. 21, 2001

(65) Prior Publication Data

US 2005/0015261 A1   Jan. 20, 2005

(51) Int. Cl.
*G06Q 90/00* (2006.01)
(52) U.S. Cl. ............................................ 705/10; 705/7
(58) Field of Classification Search ................... 705/10
See application file for complete search history.

(56) References Cited

U.S. PATENT DOCUMENTS

| | | | | |
|---|---|---|---|---|
| 5,459,656 | A | * | 10/1995 | Fields et al. .................... 705/7 |
| 5,615,109 | A | | 3/1997 | Eder |
| 5,822,736 | A | | 10/1998 | Hartman et al. |
| 5,940,818 | A | | 8/1999 | Malloy et al. |
| 5,943,668 | A | | 8/1999 | Malloy et al. |
| 5,970,476 | A | | 10/1999 | Fahey |
| 5,987,425 | A | | 11/1999 | Hartman et al. |
| 6,044,354 | A | | 3/2000 | Asplen, Jr. |
| 6,101,484 | A | | 8/2000 | Halbert et al. |
| 6,192,470 | B1 | | 2/2001 | Kelley et al. |
| 6,826,538 | B1 | * | 11/2004 | Kalyan et al. .................. 705/7 |
| 2002/0013720 | A1 | * | 1/2002 | Ozono et al. .................. 705/7 |
| 2002/0116348 | A1 | * | 8/2002 | Phillips et al. .............. 705/400 |
| 2002/0123930 | A1 | * | 9/2002 | Boyd et al. .................... 705/14 |
| 2005/0102189 | A1 | * | 5/2005 | Lopez et al. .................. 705/26 |

FOREIGN PATENT DOCUMENTS

WO      WO99/26168       *   5/1999

OTHER PUBLICATIONS

Smith, Gerald E., and Nagle, Thomas T. Financial Analysis for Profit -Driven Pricing, Sloan Management Review, vol. 35 No. 3, Spring 1994, pp. 71-84.*

* cited by examiner

*Primary Examiner*—Beth Van Doren
*Assistant Examiner*—Andre Boyce
(74) *Attorney, Agent, or Firm*—Scully, Scott, Murphy & Presser, P.C.; Kerry B. Goodwin, Esq.

(57) ABSTRACT

A system and method for analyzing a business comprising generating a matrix for analysis and planning that utilizes trend changes in the Average Selling Price (ASP) of End-User Products (EUP) and the trend changes in the OEM price of specific components used in the EUP to provide quantifiable "fact based" analysis, quantification, planning, and measurable actions for developing profitable business plans and tracking their progress against the business objectives.

9 Claims, 17 Drawing Sheets

| 20 | S1<br>Delta Period<br>to Period<br>Deliverable<br>ASP >=0 | S2<br>Delta Period<br>to Period<br>Deliverable ASP<br>< 0 & Flat | S3<br>Delta Period<br>to Period<br>Deliverable ASP<br>< 0 & Declining |
|---|---|---|---|
| C3<br>Delta Period<br>to Period<br>Component<br>ASP >=0 | Solution Value-<br>Driven Zone<br>Significant Value<br>Proposition-Profit<br>likely and Primarily<br>Value Dependent<br>22 | Component<br>Value-Driven &<br>Deliverable Price-<br>Driven Zone<br>Component Value<br>Proposition -<br>Profit Possible | Component<br>Value-Driven &<br>Deliverable Share<br>-Driven Zone<br>Low Deliverable<br>Value Proposition<br>Profit Limited |
| C2<br>Delta Period<br>to Period<br>Component<br>ASP < 0 & Flat | Deliverable<br>Value-Driven &<br>Component Price<br>-Driven Zone<br>Deliverable Value<br>Proposition-Profit<br>Possible | Solution Price-<br>Driven Zone<br>Value Proposition<br>not Significant<br>Profit Primarily<br>Cost Dependent<br>24 | Component<br>Price-Driven &<br>Deliverable Share<br>-Driven Zone<br>No Deliverable<br>Value Proposition<br>-Profit Difficult |
| C1<br>Delta Period<br>to Period<br>Component<br>ASP < 0 &<br>Declining | Deliverable<br>Value-Driven<br>& Component<br>Share-Driven<br>Zone<br>Low Component<br>Value Proposition<br>-Profit Limited | Deliverable<br>Price-Driven<br>& Component<br>Share-Driven<br>Zone<br>No Component<br>Value Proposition<br>-Profit Difficult | Solution<br>Share-Driven<br>Zone<br>No Value<br>Proposition-<br>Profit Unlikely<br>26 |

| 20 | S1<br>Delta Period to Period Deliverable ASP >= 0 | S2<br>Delta Period to Period Deliverable ASP < 0 & Flat Growing | S3<br>Delta Period to Period Deliverable ASP < 0 & Declining |
|---|---|---|---|
| C1<br>Delta Period to Period Component ASP >= 0 | Solution Value-Driven Zone<br>22 | Component Value-Driven & Deliverable Price-Driven Zone | Component Value-Driven & Deliverable Share-Driven Zone |
| C2<br>Delta Period to Period Component ASP < 0 & Flat | Deliverable Value-Driven & Component Price-Driven Zone | Solution Price-Driven Zone<br>24 | Component Price-Driven & Deliverable Share-Driven Zone |
| C3<br>Delta Period to Period Component ASP < 0 & Declining | Deliverable Value-Driven & Component Share-Driven Zone | Deliverable Price-Driven & Component Share-Driven Zone | Solution Share-Driven Zone<br>26 |

Figure 2

|  | S1<br>Delta Period to Period Deliverable ASP >=0 | S2<br>Delta Period to Period Deliverable ASP < 0 & Flat | S3<br>Delta Period to Period Deliverable ASP < 0 & Declining |
|---|---|---|---|
| C3<br>Delta Period to Period Component ASP >=0 | Solution Value-Driven Zone Significant Value Proposition-Profit likely and Primarily Value Dependent 22 | Component Value-Driven & Deliverable Price-Driven Zone<br>Component Value Proposition - Profit Possible | Component Value-Driven & Deliverable Share-Driven Zone<br>Low Deliverable Value Proposition Profit Limited |
| C2<br>Delta Period to Period Component ASP < 0 & Flat | Deliverable Value-Driven & Component Price-Driven Zone<br>Deliverable Value Proposition-Profit Possible | Solution Price-Driven Zone Value Proposition not Significant Profit Primarily Cost Dependent 24 | Component Price-Driven & Deliverable Share-Driven Zone<br>No Deliverable Value Proposition -Profit Difficult |
| C1<br>Delta Period to Period Component ASP < 0 & Declining | Deliverable Value-Driven & Component Share-Driven Zone<br>Low Component Value Proposition -Profit Limited | Deliverable Price-Driven & Component Share-Driven Zone<br>No Component Value Proposition -Profit Difficult | Solution Share-Driven Zone No Value Proposition-Profit Unlikely 26 |

Figure 3

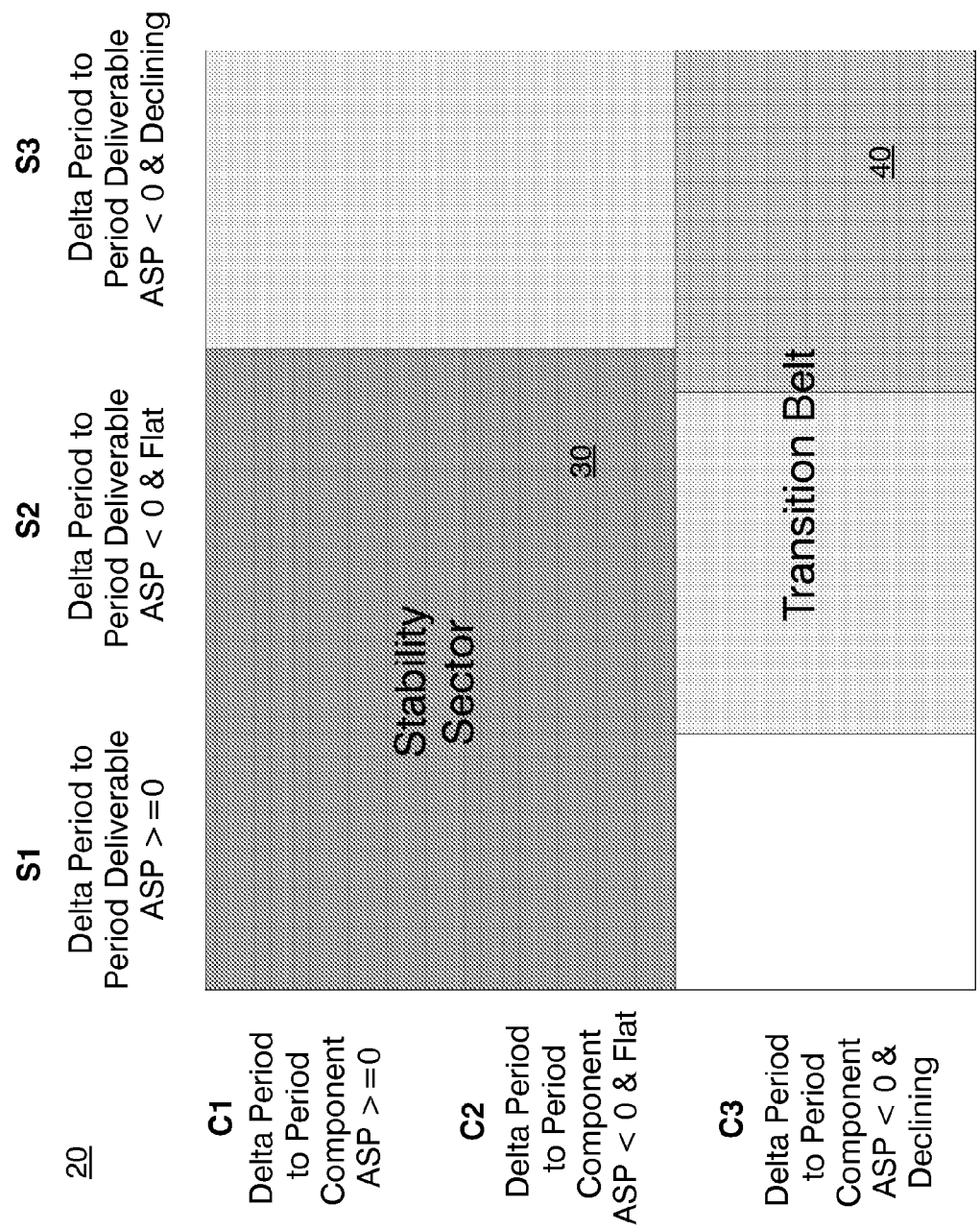

20a

|  | S1<br>Delta Period Period Deliverable >=0 | S2<br>Delta Period Period ASP < 0 & | S3<br>Delta Period Period ASP < 0 & Declining |
|---|---|---|---|
| C1 Delta Period to Period Component ASP >= | | | |
| C2 Delta Period to Period Component ASP < 0 & | '94,'95 | | '96<br>75a |
| C3 Delta Period to Period Component ASP < 0 & Declining | '97 | '99 | |

Figure 6(a)

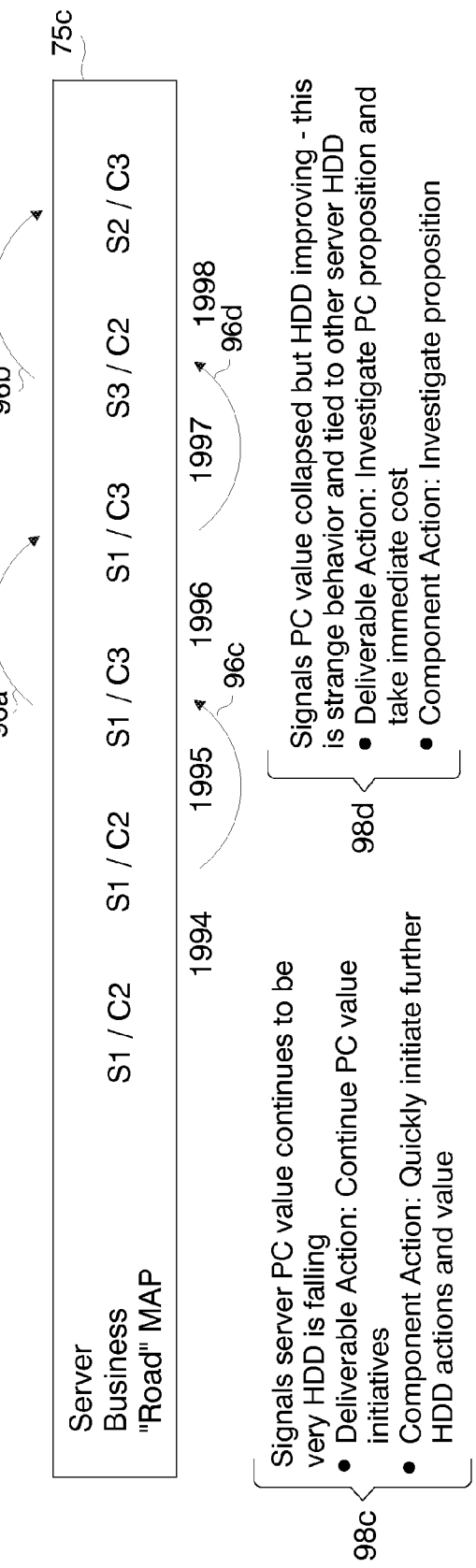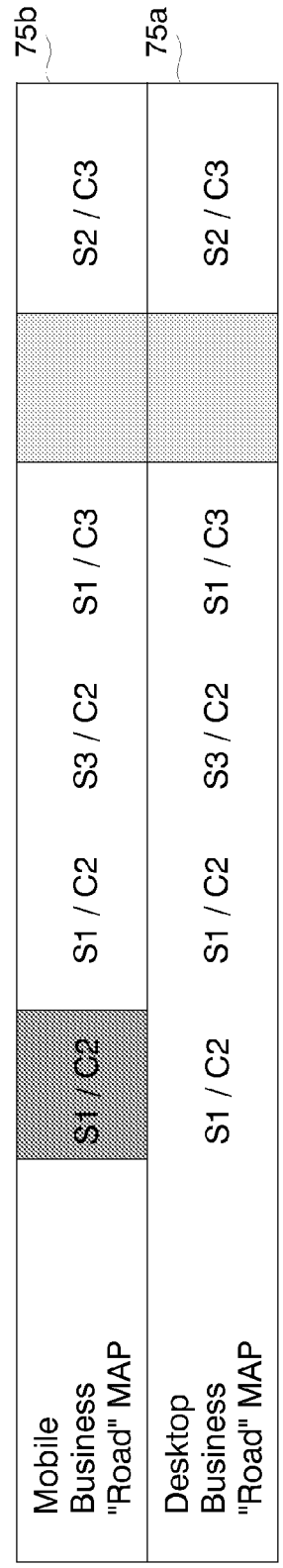
Figure 7(c)

|   | S1<br>Delta Period to Period Deliverable ASP >=0 | S2<br>Delta Period to Period Deliverable ASP < 0 & Flat | S3<br>Delta Period to Period Deliverable ASP < 0 & Declining |
|---|---|---|---|
| C1<br>Delta Period to Period Component ASP >=0 | Problem ? - Not ranked high ASP trend above zero | F  H<br>B  A | May be OK - Ranked high ASP trend above zero |
| C2<br>Delta Period to Period Component ASP < 0 & Flat | Problem ? - Not ranked ASP trend not down | N  V<br>M  C  Z | Problem ? - Ranked high; ASP trend negative |
| C3<br>Delta Period to Period Component ASP < 0 & Declining | May be OK - Not ranked; ASP trend down | E  J  R<br>X  D | Problem ? - Ranked high; ASP trend down |

200

| Deliverable Value Proposition ⟵150 | Component Value Proposition Ranking ⟵160 |
|---|---|
| 1 | X |
| 2 | B |
| 3 | M |
| 4 | A |
| 5 | C |
| 6 | Z |
| 7 | D |

Figure 10

Identify a customer value proposition (ex. broadband to the home)
Analyze the Deliverable providers most likely to benefit and rank order them
Assess the component supplier's existing relationship or relationship potential
Assess participation outlook and create action plan to enhance value proposition / cost

202

| Deliverable Ranking | Established Value Proposition | Competitive Supplies | Positioned to Deliver Future Value | No Relationship | Action Plan |
|---|---|---|---|---|---|
| Deliverable | | | | X | |
| Deliverable | | X | | | |
| Deliverable | X | | | | |
| Deliverable Provider | X | | | | |
| Deliverable | | | X | | |
| Deliverable | | | X | | |
| Deliverable | | | | X | |

Figure 11

SYSTEM AND METHOD FOR BUSINESS ANALYSIS AND PLANNING

BACKGROUND OF THE INVENTION

1. Field of the Invention

The present invention relates to business analysis systems and methods. Generally, the present invention relates to a novel business analysis tool used by businesses to ascertain, analyze and expand their value proposition; and particularly ascertain whether, at any time, a business is providing value to their customer, quantifying how much value is being provided and, how to reinforce or fix a businesses value proposition.

2. Discussion of the Prior Art

Presently, the importance of a sustainable business value proposition has recently been the subject of numerous business analysis books and publications, as businesses seek to differentiate themselves in a world of increasing technology availability and ever shortening product cycles. Unfortunately value is a very subjective thing and may mean many different things to many different people. Consequently, the insights developed for creating and driving a business value proposition have sometimes been difficult to apply from one business or industry to another.

It would be highly desirable to provide a new process/tool to help businesses focus on the importance of expanding their value proposition.

It would be further highly desirable to provide a portable and fact-based tool that quantifiably determines, at any time, if businesses are providing value to their customer, how much, and what to do to reinforce or fix their value proposition.

It would be further highly desirable to provide a portable and fact-based business management tool that facilitates analysis and planning of a business venture.

It would be further highly desirable to provide a portable and fact-based business management tool that may be used to manage cost and investment.

SUMMARY OF THE INVENTION

Accordingly, it is an object of the present invention to provide a service that facilitates a business's focus on the importance of expanding their value proposition.

It is another object of the present invention to provide a portable and fact-based tool that quantifiably determines, at any time, if businesses are providing value to their customer, how much, and what to do to reinforce or fix their value proposition.

It is a further object of the present invention to provide a portable and fact-based business management tool that may be used to manage cost and investment.

It is yet a further object of the present invention to provide a portable and fact-based business management tool that enables quantifiable evaluation of a business's current condition relative to its business plan at any time, and provides specific planning guidance.

It is yet another object of the present invention to provide a portable and fact-based business management tool that enables a business to focus a product business objective on profitability, but enables business plans to be responsibly established for products to enter markets for share-growth or revenue growth, and systematically tracks and guides movement to a profit-growth objective.

It is yet another object of the present invention to provide a portable and fact-based business management tool that provides early warnings when a business objective is unattainable, so under performing businesses can be quickly identified (and exited if necessary) and further provides cost and value investment management tools to help optimize profitability.

It is still a further object of the present invention to provide a portable and fact-based business management tool that is enabled to perform a fact-based assessment of the relative contribution of components within a system to the system owner, particularly, by analyzing the ranking of components relative to the system value proposition and, further assists in the determination of whether or not behavior of the system procurement organization aligns with the system value proposition, and stimulates corrective action accordingly.

According to at least one embodiment of the invention, there is provided a system and method for analyzing a business providing deliverable end-user products to consumers, the end-user products comprising components wherein each deliverable product and component have a perceivable cost and consumer value proposition, the method comprising: a) obtaining Average Sales Price (ASP) trend data f or a deliverable end-user product provided by the business and tracking changes of the trend data over a period of time, the period divided into one or more time intervals;

b) obtaining ASP trend data for one or more components used in the deliverable end-user product and tracking changes of the trend data for each component over the period of time; c) generating a data structure including elements for characterizing trend data as meeting certain performance criteria; d) mapping the trend changes for each period to the elements in the data structure; and, e) performing analysis of the elements for each component and deliverable product in each period, the elements providing an indication for when a potential corrective action may have been performed to increase a value or cost proposition for a component or deliverable product.

It is understood that the system and method described herein may additionally be used for real-time applications, e.g., for real-time assessing value proposition of deliverables and components and ascertaining if product (deliverable and component) pricing structures currently implemented accord to a defined business plan.

Advantageously, the BMAP of the invention provides fact-based (unemotional) business analysis assessments as near-in or as far back as desired with the only data needed to run the Business MAP being the Average Sales Price (ASP) trend data for the Deliverable product and any of its Components which is readily available in the public domain. The BMAP tool quantifiably evaluates the current business condition relative to the business plan at any moment in time and provides specific planning guidance. The business management only needs to have a perception of what their customer value proposition is, a willingness to create a plan to go after it and a commitment to measure it. The BMAP tool focuses business objectives on profitability, but allows business plans to be responsibly established to pursue emerging market opportunities where products may need to enter markets with initial market share growth objectives. The Business MAP further systematically tracks and guides movement of these products towards a profit growth objective.

BRIEF DESCRIPTION OF THE DRAWINGS

Further features, aspects and advantages of the apparatus and methods of the present invention will become better understood with regard to the following description, appended claims, and the accompanying drawings where:

FIG. 2 illustrates conceptually, the Business MAP matrix according to the invention having column headings representing Deliverable ASP Trends (S1, S2, S3) and the row headings representing Component ASP Trends (C1, C2, C3);

FIG. 3 illustrates the BMAP matrix implemented as a rudimentary estimator with each matrix element being characterized as providing a profit outlook, FIG. 4 is an illustration of the Business MAP 20 divided into two main sectors, a stability sector and a transition belt sector;

FIGS. 6(a)-6(c) illustrate the respective mapping of the example PC/HDD ASP industry segment trend data 55a-55c for the respective Desktop, Mobile and Server industry segments depicted in FIG. 5 into respective BMAPs 20a-20c;

FIGS. 7(a)-7(c) illustrate respective results of the analysis of the mapped Business Road maps for the respective example PC/HDD ASP Desktop, Mobile and Server industry segments including the respective corrective actions from the view point of the deliverable and the component;

FIG. 10 depicts an example of the relative contributions of components within a system (Deliverable) value proposition 150 for a product that has been ranked and the Components 160 in the Deliverable matched to the system value proposition;

FIG. 11 depicts a chart 202 that facilitates the quantification (from a component viewpoint) of the attractiveness of a value proposition and the relative position the component is relative to EUP suppliers going after the market.

DETAILED DESCRIPTION OF THE PREFERRED EMBODIMENTS

In accordance with an exemplary embodiment, the present invention is a business analysis tool, referred to as Business MAP (Matrix for Analysis and Planning), that is a totally portable and fact-based tool that quantifiably determines, at any time, if businesses are providing value to their customer, how much, and what to do to reinforce or fix their value proposition. In addition to the analysis and planning, the Business MAP ("BMAP") may additionally be used to manage cost and investment. The Business MAP works from publicly available information which is used to generate a simple matrix tool that any business can use for the analysis and/or planning of a successful value proposition. The premise of the Business MAP is that the value customers place on a given product or service may be analyzed by looking at the trend in the Average Sales Price (ASP) of the product (or service) and any one of its components, and that this in turn can be used to drive positive business results. With the Business MAP and the readily available ASP data, a business management team may, at any time, quickly take the value pulse of their product or service and follow-up with specific action.

Figure 1:
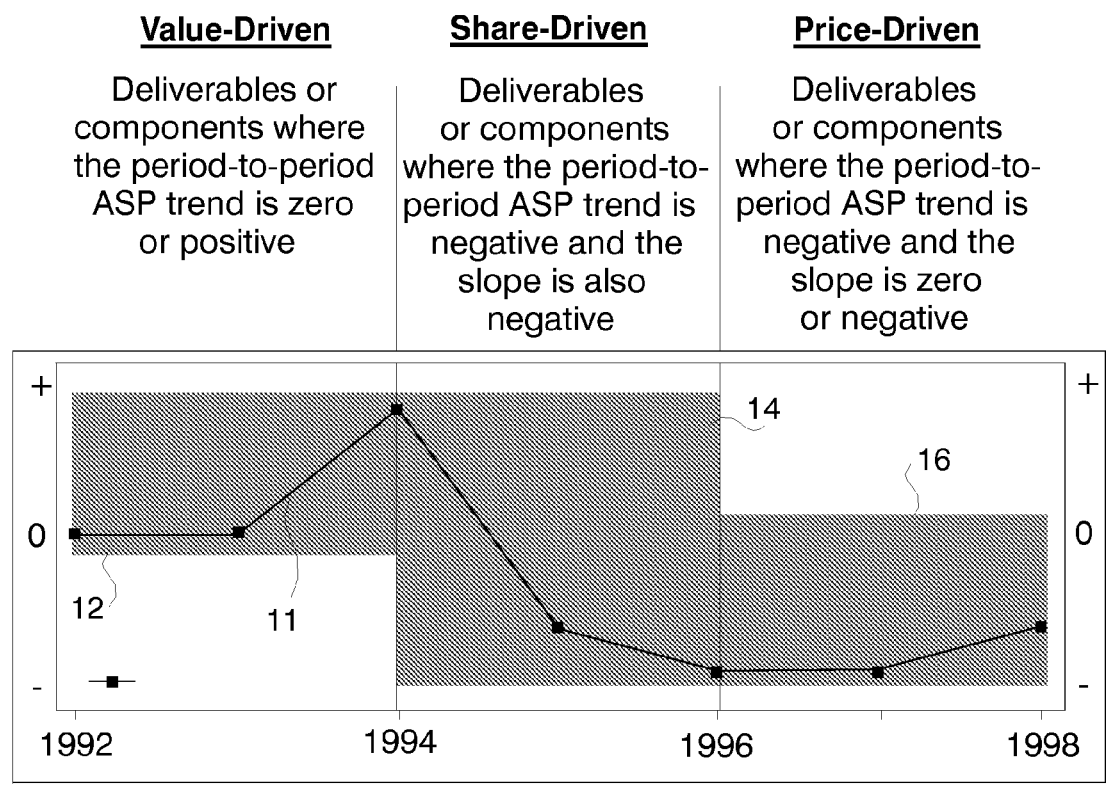
FIG. 1 is a diagram illustrating some of the terms and definitions that will be referred to in the detailed description.

Some terms and definitions that will be referred to in the detailed discussion are now provided with particular reference to FIG. 1.

Deliverable—a Deliverable is a product, system or service sold to an end-user with at least one Component. This is additionally referred to herein as an End-user product ("EUP").

Component—a Component is a device, subsystem or sub-service that is an element of a Deliverable.

Solution—a Solution is the value proposition defined by a Deliverable and one of its Components.

Deliverable Average Sales Price (DASP)—the Deliverable ASP is usually referred to as the retail price (sometimes called "street" price). It is the price the end-user customer pays to purchase or lease the Deliverable and its Components.

Component Average Sales Price (CASP)—the Component ASP is usually referred to as the OEM (Original Equipment Manufacturer) price. It is the price paid by a Deliverable procurement person to use a Component in the Deliverable.

Value-Driven Products or Services—as illustrated in the Business MAP 10 depicted in FIG. 1, Value-Driven Products or Services defines deliverables or components 11 where the period-to-period ASP trend 12 is zero or positive as being Value-Driven.

Price-Driven Products or Services—as illustrated in the Business MAP 10 depicted in FIG. 1, Price-Driven Products or Services defines deliverables or components where the period-to-period ASP trend 16 is negative with flat or positive slope as being Price-Driven.

Share-Driven Products or Services—the Business MAP defines deliverables or components 11 where the period-to-period ASP trend 14 is negative with negative slope as being Share-Driven.

It should be understood that, for the Business MAP, the Average Sales Price (ASP) is always viewed on a period-to-period basis where the periods may be defined to be any interval that is sufficient to define a trend. The period-to-period ASP is derived by subtracting an earlier period, e.g., Period 1, from a following period, e.g., Period 2, and dividing the result by Period 1 to obtain a percent result. When it is zero or positive, a Value-Driven state exists. When it is negative but constant or improving, a Price-Driven state exists; and when it is negative and declining, a Share-Driven state exists. More particularly, the Business MAP is a unique process and tool that drives both the end-user Deliverable and its Components to converge on the same overall customer value proposition. This helps prevents the "tunnel vision" that sometimes exists between end-user and subassembly solutions. It will work for described by a Deliverable and (at least) one Component.

More particularly, as shown in FIG. 2, the Business MAP is a matrix 20 having column headings representing Deliverable ASP Trends (S1, S2, S3) and row headings representing Component ASP Trends (C1, C2, C3). The numbers (1, 2, 3) in both the column and row headings correspond to the same type of ASP trend behavior. For example, a column or row heading with the number 1 (e.g., S1 or C1), corresponds to an ASP trend that is zero or positive period to period. A column or row heading with the number 2, corresponds to an ASP trend that is negative (i.e., <0) but either constant or improving period to period. A column or row heading with the number 3, corresponds to an ASP trend that is negative (i.e., <0) and getting more negative period to period. When both the Deliverable and Component have the same row and column numbers (e.g., S1 and C1), the product or service is balanced and the Business MAP refers to these three states as the Solution Value-Driven zone (VDZ) 22, the Price-Driven (PDZ) 24, and the Share-Driven zone (SDZ) 26, respectively. They are shown on the diagonal running from the upper left corner to the lower right in FIG. 2. All the other squares in the Business MAP 20 represent states where either the Deliverable or the Component are bringing larger value to their respective customer. It should be understood that the SX/CX designations are referred to herein in the subsequent explanations of the Business MAP. Examples that make clear the value of each square of the Business MAP will be addressed later in the text.

As will be explained in greater detail, when one or both the system and component are in a VDZ 22, the customer perceives significant value and a price threshold has been achieved where the customer does not push for lower period-to-period price reductions. This defines the area for greatest profit potential and, therefore, the theoretical objective of all businesses. When one or both the system and component are in a PDZ 24, the customer perceives value, but it is not sufficient to prevent them from pushing for lower period-to-period reductions. This defines the area where revenue growth potential exists, but may have limited profitability. Together these segments form what is called a "Stability Sector" as will be described. Businesses may operate indefinitely in this area by managing the cost and value proposition for the system and component. When one or both the system and component are in a SDZ 26, the customer does not perceive value. That is, either the product was introduced into the SDZ to temporarily gain Market Share, or it was thrown there by disruptive competitive forces. In any case, the SDZ is a Transition Belt and cannot sustain profitable business for extended periods of time. However, it can be used for share-growth and market positioning as will be explained in greater detail herein with a hypothetical example.

In its simplest form, the nine squares that comprise the BMAP matrix 20 may be used as a rudimentary estimator of profit potential with the profit outlook for each square being characterized in accordance with FIG. 3. Particularly, when a square may be designated by either a S1 or C1 (or both), the solution is comprised of either a Deliverable or Component that is Value-Driven and the profit outlook is positive. When a square cannot be designated by either a S1 or C1, the solution is comprised by either a Deliverable or Component that is Price-Driven or Share-Driven and the profit outlook is cost dependent or unlikely. However, as many businesses choose (or are forced by competitive market conditions) to operate in the profit limited squares, these areas may actually be quite useful to the overall profit attainment plans of the business venture under certain conditions as will be described in greater detail.

FIG. 4 is an illustration of the Business MAP 20 divided into two sectors 30, 40. The upper left matrix elements designated as S1/C1, S1/C2, S2/C1, and S2/C2 of the Business MAP 20 of FIGS. 1 and 2, are called the Stability Sector 30. Businesses operating in any square in this area of the Business MAP may do so successfully for extended periods of time simply by managing their cost and value proposition. The Transition Belt sector 40, includes the remaining five squares where either the Deliverable or Component (or both) is in their Share-Driven Zone. This may have been planned as a step in a strategy to gain market share or it may have been the result of competitive market forces. In either case, it is a temporary position and businesses cannot remain in the Transition Belt for extended periods without Share (or Stake) Holder dissatisfaction. From a Deliverable viewpoint, the goal of an end-user product (deliverable) supplier is to use the Business MAP process to improve the value-proposition of the EUP and identify components that will assist in this goal, i.e., identify Components that have sufficient value to help move the overall value of the Deliverable to the left most column of the Business MAP (or at a minimum, keep it operating in the Stability Sector until a broader value proposition can be found). From the Component viewpoint, the goal of a Component supplier is to use the Business MAP process to identify Deliverables or EUPs (Systems) that have the ability to move to the VDZ and to adjust the value proposition of the Component to speed that along, i.e., identify Deliverables that the Component may drive with its value proposition into the Solution Value-Driven Zone of the Business MAP (or again, at a minimum, sustain Stability Sector operation).

Figure 5:
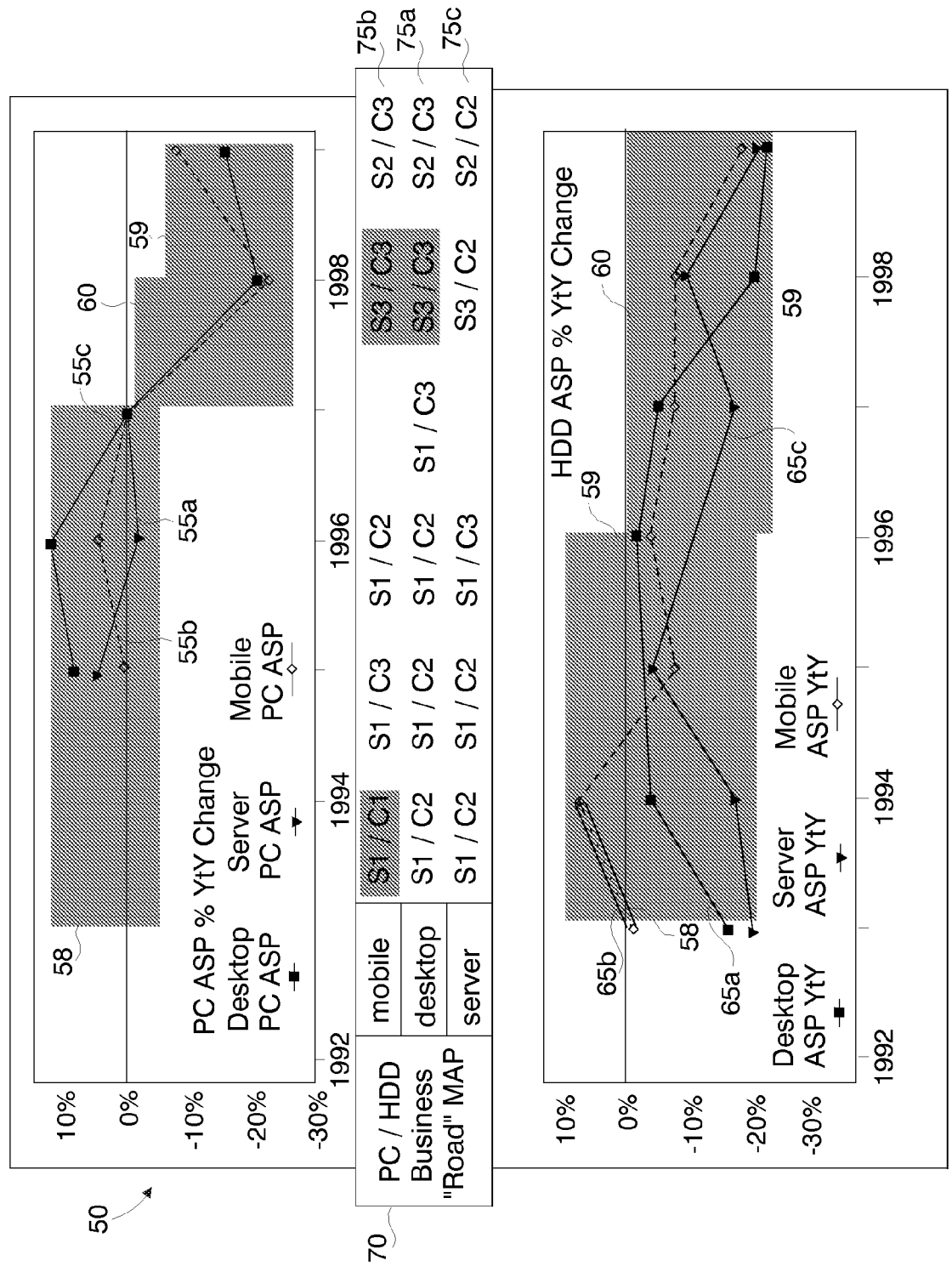
FIG. 5 illustrates the historical year-to-year (YtY) ASP trends for two example industries from 1992-1999, the PC (deliverable) and the Hard Disk Drive (component)

FIG. 5 illustrates the historical year-to-year (YtY) ASP trends 50 for two example industries, e.g., a Deliverable such as a personal computer ("PC") where the PC industry trends 55$a,b$, $c$ for the three primary industry segments: desktop 55$a$, mobile 55$b$, and server 55$c$, are indicated between the years 1992 through 1999; and, the Component such as a Hard Disk-drive ("HDD") where the HDD industry trends 65$a,b$, $c$ for the three primary industry segments: desktop 65$a$, mobile 65$b$, and server 65$c$ are indicated between the years 1992 through 1999. As shown in FIG. 5, the data provided in the block indicated as block 58 indicates a Value-Driven (S1 or C1) column or row in the BMAP; the data provided in the block indicated as block 59 indicates a Price-Driven (S2 or C2) column or row in the BMAP; and the data provided in the block indicated as block 60 indicates a Share-Driven (S3 or C3) column or row in the BMAP. In between the two plots, is a strip called the Business "Road" MAP 70 which illustrates the PC and HDD ASP trends graphed as a consolidated view for the three primary industry segments: desktop 75$a$, mobile 75$b$, and server 75$c$ and provide an indication of what happened to the overall industries and how the segments behaved relative to it. After obtaining the Deliverable ASP trend for each industry segment and the Component ASP trend for each industry segment, and plotting each as shown in FIG. 5, the Business "Road" Map generation is the next step in the analysis phase of the Business MAP process. Although not shown in FIG. 5, the information available for PC ASP trends 55$a,b$, $c$ for 1993 and 1994 indicates that it was in the Value-Driven Zone and will be the assumption for purposes of discussion herein.

According to the invention, an algorithm is implemented for deriving the Business "Road" MAP 70 as will now be explained. To use the Business MAP process for analysis, first, the user starts with that portion of the Business "Road" MAP 70 showing the system ASP trend data, e.g., 55$a$, and the Component ASP trend data, e.g., 65$a$, and maps the trend for each time interval to the elements of the business matrix BMAP 20. FIG. 6($a$) illustrates the mapping of the example PC/HDD "Desktop" industry segment trend data 55$a$ depicted in FIG. 5 into BMAP 20$a$ resulting in the (SX/CX) transformation for the Business Road MAP 70. As shown in FIG. 6($a$), for the desktop segment in 1994 to 1995, the PC ASP trends were in S1 while the HDD ASP were in C2. Therefore, the Business "Road" MAP 70 shows the solution was positioned in S1/C2 for this time period as shown in FIG. 6(a). This process is repeated for the creation of the remainder of the Desktop Business "Road" MAP 70 shown between the two graphs which use the Business MAP 20a to move through trend data and characterize the movement between matrix elements. Once the Business "Road" MAP 70 is created, it may be analyzed for action that should have been taken at each period transition as will be further described herein. This is useful when trying to understand what happened to a business segment after the fact.

Figure 7A:
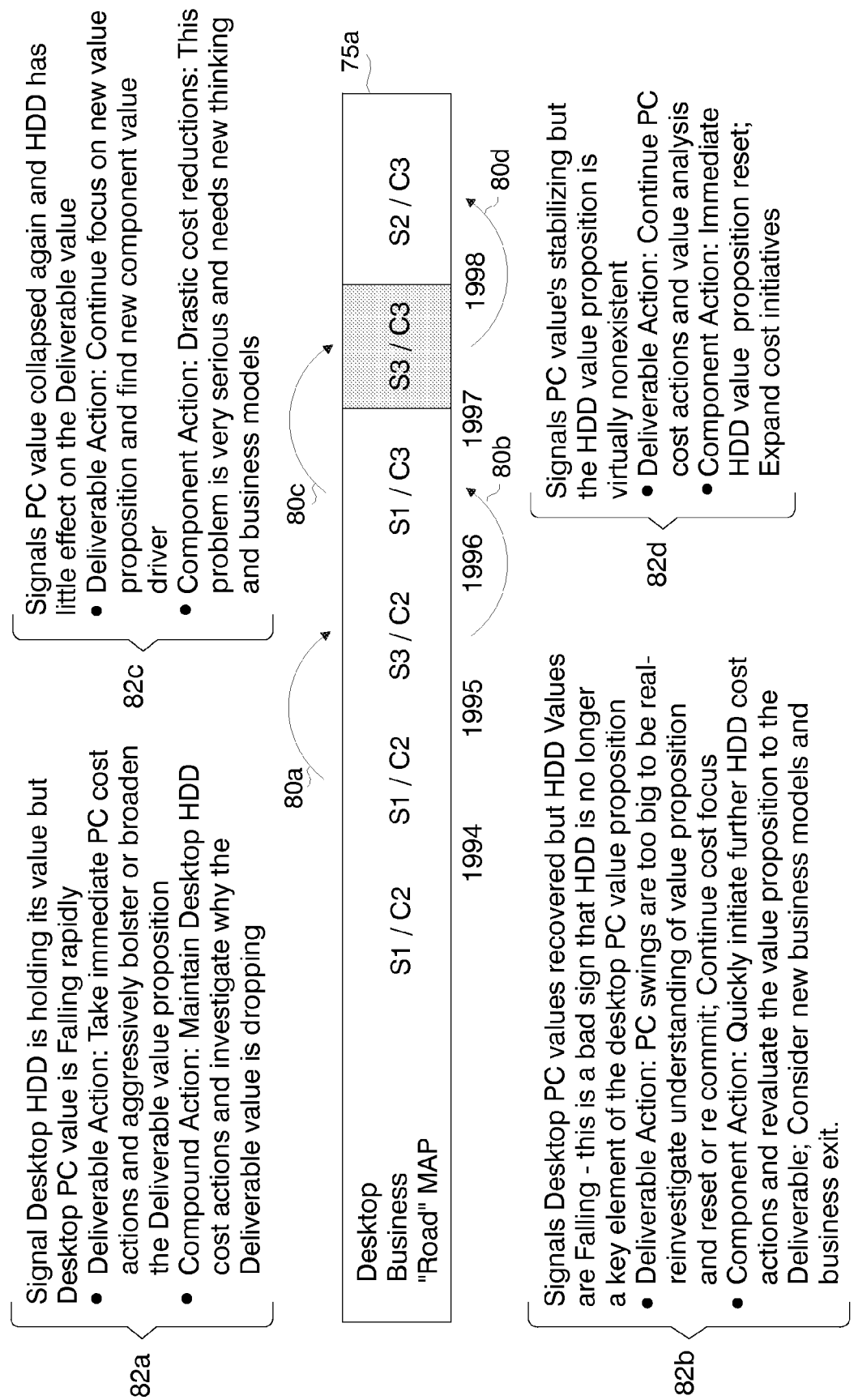

Turning the focus specifically to the Business "Road" MAP 75a for the PC/Desktop industry segment example, the next step involves the analysis of the map and the determination specific actions that may be taken as shown in FIG. 7(a). In the desktop example, it is clear from the dynamics indicated by the map that customers and suppliers were searching for something during the period of 1995 through 1997. In hindsight, as it turned out, it was affordable Internet access. Only recently had information (not shown) revealed that customer storage usage has not grown as fast as the 100% year to year growth that has taken place annually since 1993 in storage capacity (megabytes) shipped. Thus, in retrospect it is clear that the de-emphasis on HDD as a key part of the PC value proposition was just a matter of time unless some new storage usage driver emerged. However, the Business MAP 75a of FIG. 7(a) does indicate that something was happening. That is, the analysis of FIG. 7(a) indicates or strongly suggests the status of the value proposition (for deliverable PC and component HDD) at respective transition periods 80a-80d as indicated, and further suggests corrective actions from the view point of the deliverable and component as indicated as 82a-82d. In this example, annual sampling was used. More frequent sampling with an aggressive action plan would have tightened the feedback loops and allowed quicker determination as to whether the actions were moving things in the right direction or not. It should be understood that the Business MAP does not specifically indicate what value or cost actions should be taken; it only indicates the timing of them. However, by choosing a sample rate, the Business MAP will immediately tell a management team whether what they are doing is making progress or not. Often times when the management has a portfolio (i.e., Desktop PCs, mobile PC, etc.), and one segment of it is doing well, the overall results may be positive but are actually hiding an underlying value problem in the under performing segment(s). The Business MAP brings these to light and alerts the management that action is required. This enhances the portfolio process and fosters better overall decisions and optimizations.

Figure 6B:
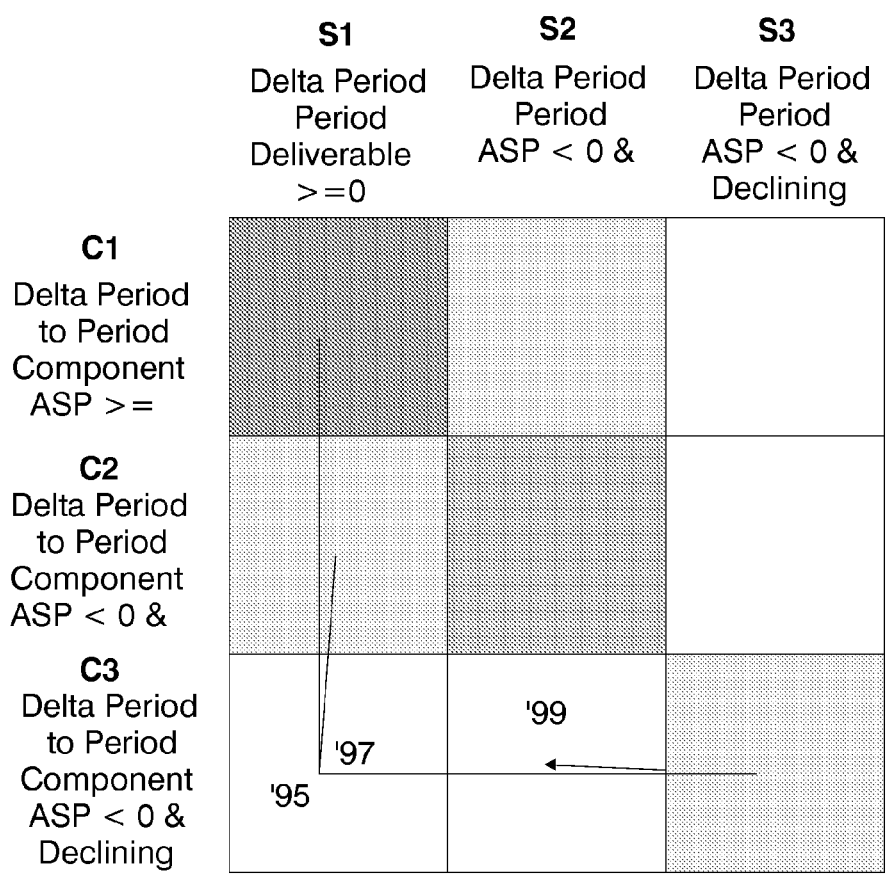

FIG. 6(b) illustrates the mapping of the example PC/HDD "Mobile" industry segment trend data 55b depicted in FIG. 5 into BMAP 20b resulting in the (SX/CX) transformation for the Business Road MAP 70. As shown in FIG. 6(b), for the mobile industry segment, the years of 1992 to 1997 were good for the mobile PCs as PC prices were significantly above zero and even increased during this period. However mobile HDDs bounced around and struggled to find their value proposition after a very good 1994 time period. Similar to desktop though, the Business "Road" MAP 70 shows a significant amount of dynamics as mobile solutions approached a "crash" of 1998, and a continuing loss of the HDD value proposition in mobile PCs.

Figure 7B:
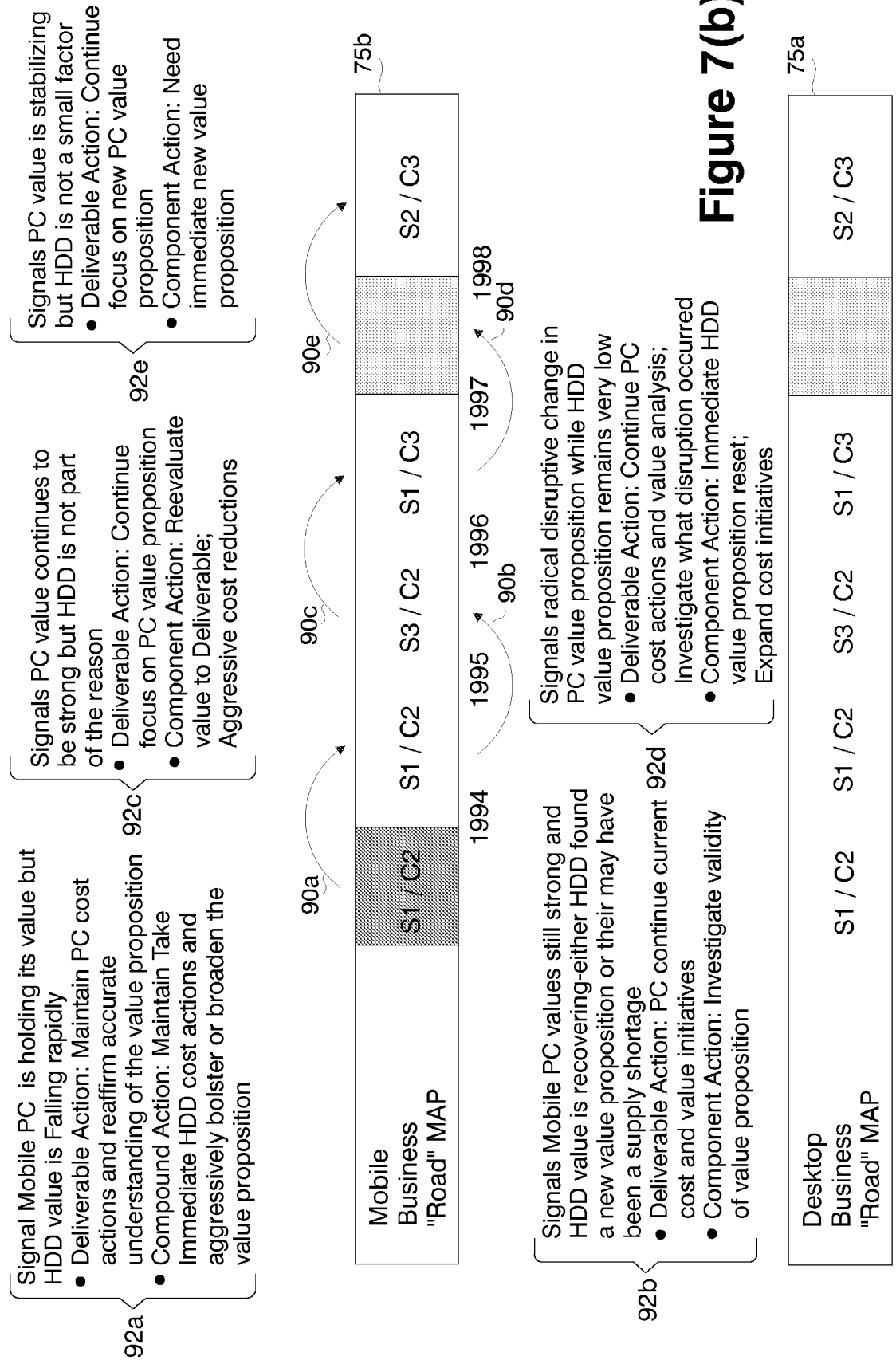

Turning the focus specifically to the Business "Road" MAP 75b for the PC/Mobile industry segment example, the next step involves the analysis of the map and the determination specific actions that may be taken for the time intervals 90a-90e as shown in FIG. 7(b). In FIG. 7(b), both the mobile solution Action Identifications 92a-92e for the respective time intervals and the desktop "Road" MAP 75a (provided for reference) are shown. Since many of the PC and HDD Component suppliers serve both markets, it is easy to see that when one is up and another is down (as was the case in the 1995 time interval), the focus may have come off of what was happening in the under performing segment(s), and as seen in the example shown in FIG. 7(b), eventually all segments experienced the "crash" in 1998. In this case, management would have been alerted 2-3 years in advance of the "crash" that things were changing.

Figure 6C:
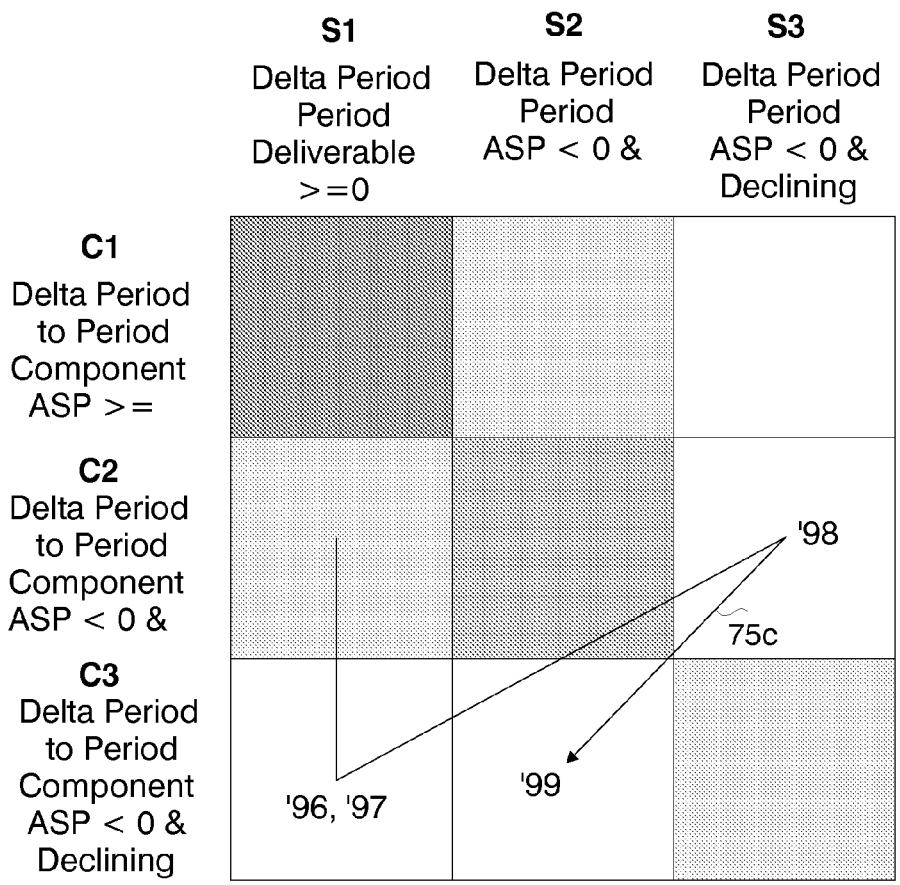

FIG. 6(c) illustrates the mapping of the example PC/HDD "Server" industry segment trend data 55c depicted in FIG. 5 into BMAP 20c resulting in the (SX/CX) transformation for the Business Road MAP 70. As shown in FIG. 6(c), the server industry example is slightly unique from those of desktop and mobile because the server HDD ASP trends were also influenced by Storage Subsystems, which were purchasing the same HDDs. The PC users of the Business MAP for this segment would have thought the ASP trend behavior in 1998 to be unusual (server HDD prices going up as server PCs were "crashing") unless they understood that server HDDs were not supplied only to server PCs.

Turning the focus specifically to the Business "Road" MAP 75c, the changes may be analyzed and specific actions may be determined for the time intervals 96a-96d as shown in FIG. 7(c). In FIG. 7(c), there is illustrated how the server Business Road map compares with both the mobile 75b and desktop 75a solutions. In FIG. 7(b), both the server solution Action Identifications 98a-98d for the respective time intervals 96a-96d and the desktop and mobile "Road" MAPs 75a, 75b (provided for reference) are shown. Since a few of the PC and HDD Component suppliers serve all three markets, it is easy to see that this was a very complicated and confusing environment from 1995 to 1998. Without the Business MAP 20c to provide a framework for analyzing the dynamics of this period, decisions were difficult and the information needed to make them was hard to come by. The Business MAP allows the segments to be analyzed, both separately and together, to see the ramifications of both the industry dynamics and those of segments within it.

It is an aspect of the present invention that the Business MAP requires no drill down, just an ongoing review of ASP trends for Deliverables and their key components (and any other Deliverables that those components bring value to). This is in contrast to the prior art analysis tools and processes that require "drill down" techniques which tend to suffer from the problem that when the analyzers reach the currently accepted theory, they stop the analysis.

Putting the PCs and their associated HDD Components back together by relooking at FIGS. 6(a)-6(c) side-by-side, allows some telling points to be made about the PC and HDD industries from 1994 to the present. When looking at these Business MAPs 20a-20c from the perspective of the HDD industry, the routes 75a-75c taken point out how the HDD value proposition manifested itself over time to the PC. On all PCs, HDD helped make CD-ROM a valid content distribution mechanism but once the HDD capacity exceeded CD-ROM's 650 MB/disk on the desktop PC, the HDD value dropped off and has not returned. A similar situation occurred for mobile but the early year dynamics were bigger as the mobile segment customers sought to determine whether mobile PCs were portable workstations or traveling network access devices. In server PCs, the time frame for the drop in HDD value is about the same but the unique performance of 1998 indicates either a supply shortage or a significant effect of the storage systems platforms these devices were also supplying.

The net is that the historical drivers of the HDD business—cost per megabyte stored, cost per megabyte transferred, and form-factor—are not key value propositions for PCs. This is not to say that an HDD Component supplier with leadership in cost or the time-to-market introduction of new features and functions cannot grow their business and make profit. It simply says that customers are changing the way they view personal storage value, and unless the HDD industry finds new Deliverables or identifies new value propositions for existing PCs, the potential for industry wide growth will continue to decline. This results in consolidation, as the industry cannot support as many players, and a continuing reduction in industry profitability.

When looking at these Business MAPs from the perspective of the PC industry, the picture is quite different. In 1994, all PCs were in S1 and by 1999 they all ended up in S2. There is no question that the customer's perception of PC value dropped over time, however not as badly as HDD. The current position is tenuous but the Business MAP is telling PC management to reanalyze their business, identifying new value propositions and the Components that can enhance them.

According to the invention, multiple PC Business MAPs may be generated that repeat the above analysis for components such as for processors, software, interface cards, etc. Such an analysis would inevitably point out which components are driving value and lead to new insights into what customers perceive as value from PCs. This aspect of the utilization of the BMAP to exploited to perform a Value Proposition Ranking (VPR) function as will be described in greater detail herein.

Figure 8A:
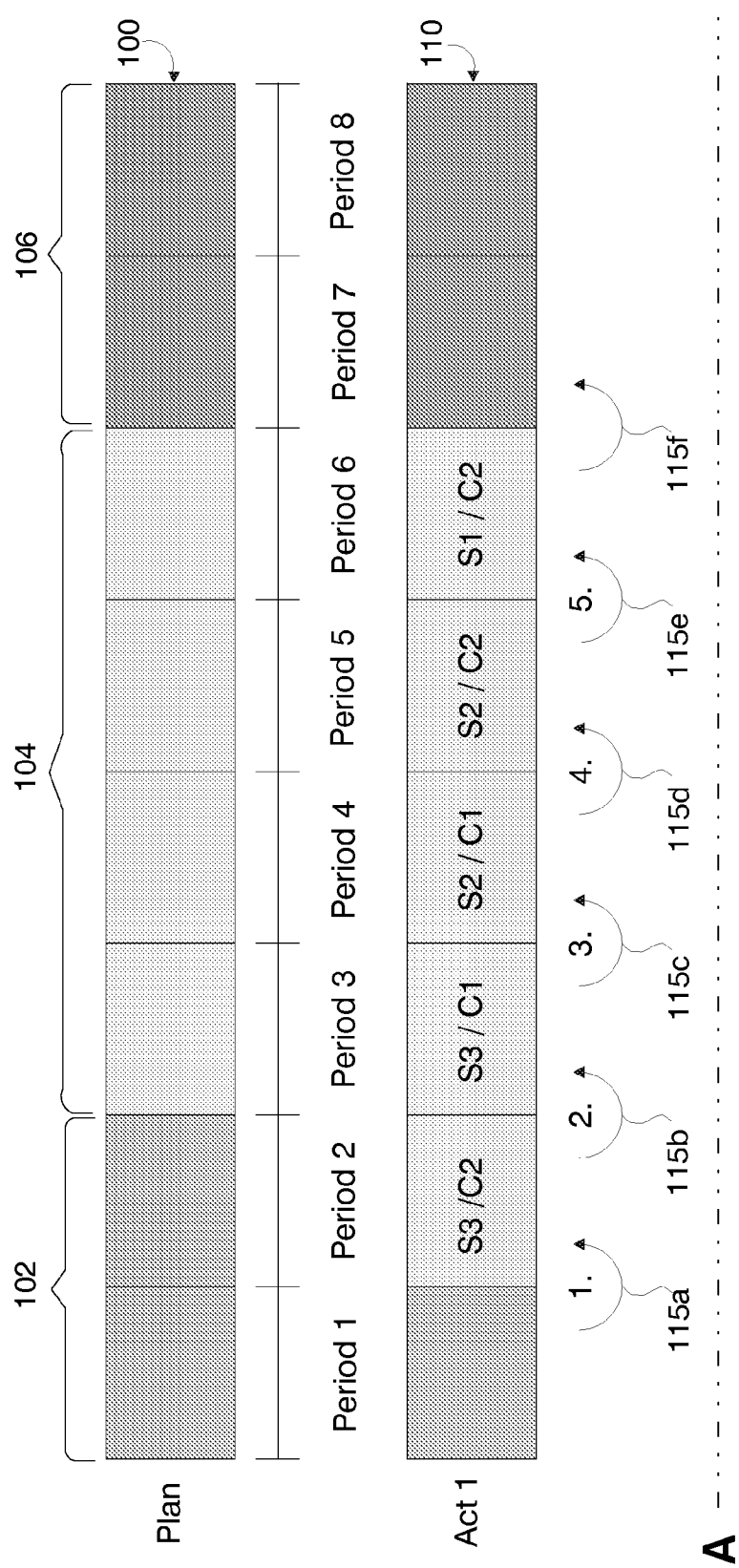
FIG. 8 illustrates a hypothetical business plan 100 intended to position a product (or service) for movement from an initial Share-Driven zone to the Solution Price-Driven Zone by assumed enhancements to both Deliverable and Component value propositions.
Figure 8B:
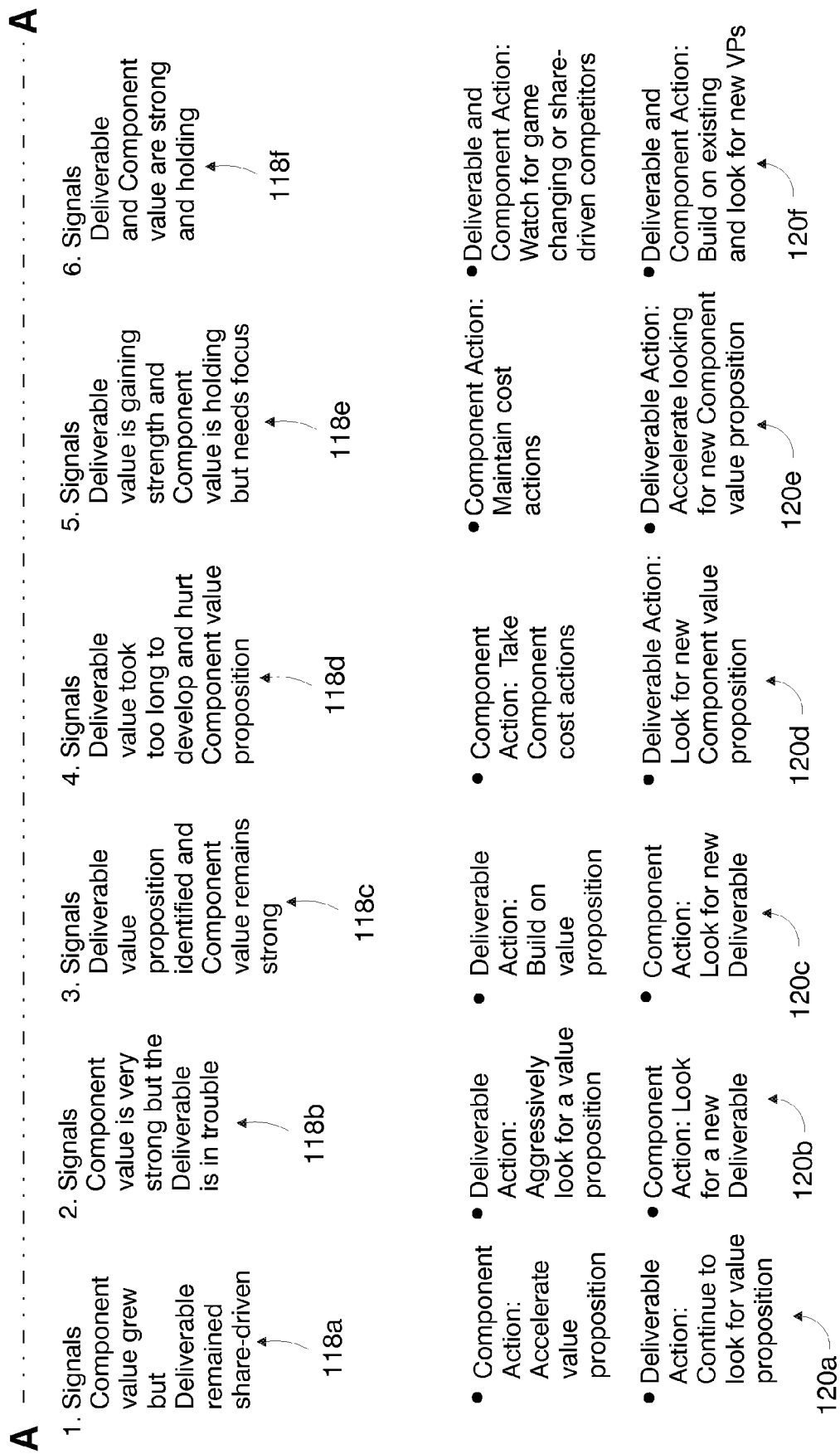

In a preferred embodiment, the BMAP process provides for the real-time assessment of proposed business plans and timely corrective action. In a hypothetical example, it is assumed that an emerging market opportunity is opening and a management entity believes that over time it will become large and that their business may bring significant value to it. However to do so, a key prerequisite is to immediately gain share with aggressive pricing prior to establishing a longer term value proposition and growing a profitable business. More particularly, FIG. 8 illustrates a hypothetical business plan (Plan) 100 intended to position a product (or service) for initial share-growth for two periods 102, e.g., two six-month periods, followed by assumed enhancements to both Deliverable and Component value propositions which are intended to move the product into the Solution Price-Driven Zone 24 for four periods 104, and eventually into a Solution Value-Driven Zone 22 in subsequent periods 106. In the preferred embodiment, the sample increment is as frequent as valid ASP trend data may be accumulated. In the example depicted in FIG. 8, the interval is assumed to be six months. The Business "Road" MAP 110 (Act1) indicated in FIG. 8 provides an analysis 118a-118f of what may have "really" happened per time period 115a-115f and what actions 120a-120f per respective time period the Business MAP would have indicated should be done by the business management team.

As shown from the analysis provided in FIG. 8, the Deliverable and Component value propositions did not emerge at the same time and this forced the solution to remain longer in the Transition Belt putting some strain on the business performance. The delays in the emergence of the Deliverable value proposition also forced delays in enhancements to the Component value proposition. The net is that although the business ended up in the Price-Driven Zone 106 it took a roundabout way of getting there and was unlikely to have had the cost positioned for optimum profit. In the end, the profitability goal was achieved but again not in the way that was planned. The BMAP however would have enabled management to real time assess the dynamics and take the corrective actions to get back on track.

Figure 9:
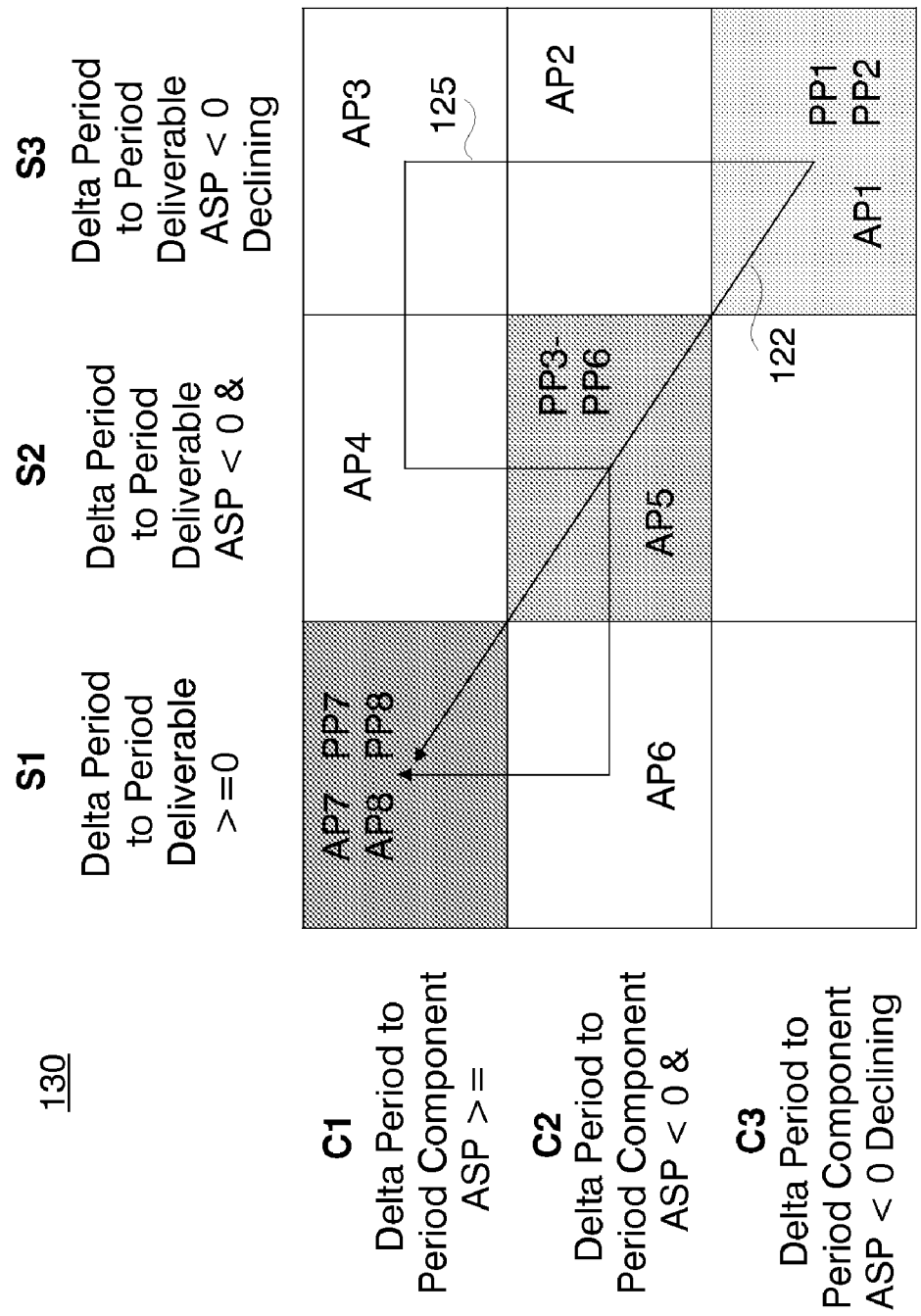
FIG. 9 illustrates the planned vs. actual paths taken for the example hypothetical plan provided in FIG. 8.

FIG. 9 illustrates is BMAP 130 illustrating the planned vs. actual paths taken for the example hypothetical plan 100 provided in FIG. 8. The actual path 125 shows, by period AP1-AP8, how the impacts of identifying and executing on the value proposition caused deviations from the planned path 122 per respective period PP1-PP8. In this example, it is assumed that it was the intention of the management team to attempt to continually move back to the original plan 100 (FIG. 8), however it is also possible that seeing how the actual plan is unfolding, a modified business plan may have been substituted for the original plan.

Thus, according to the invention, every six months, for example, or more frequently if desired, a management team may evaluate the performance of the Share-Driven plan against the status of the initiative. The Business MAP 130 would unemotionally indicate whether the value proposition was developing as planned or not, and it would do so far enough in advance to allow sufficient action and feedback to help the management team reinforce, redirect or exit the activities.

In addition to the analysis and planning capabilities that the Business MAP provides, management of Deliverables may also utilize the Business MAP, combined with a mechanism referred to as Value Proposition Ranking (VPR), to optimize cost and investment. Once a business management entity utilizes the Business MAP as an integral part of their business process, undoubtedly they will have developed an awareness of their product's value proposition and have tuned it to match (and anticipate) their customer's purchasing decisions. Adding VPR to the Business MAP process, the Deliverable value proposition information may be ranked and the contributions of each of the Components may be evaluated relative to it. It becomes a simple matter to determine whether the cost trends associated with obtaining the Components line up with the ranking priority of the contributions each Component makes to the Deliverable value proposition.

FIG. 10 depicts an example Deliverable value proposition 150 for a product that has been ranked and the Components 160 in the Deliverable that were matched to it. As seen from FIG. 10, components X, B, M, A, C, Z and D have been ranked and all significantly contribute to the value proposition while all the other Components do not. When the Component ASP trends were put on the Business MAP 200 as shown in FIG. 10, it indicated that components F, H, N and V which do not significantly contribute to the Deliverable value proposition have ASP trends firmly in the C2 and even C1 categories. Clearly the management of the Deliverable is paying too much for these F, H, N and V Components which do not significantly contribute to the Deliverable value proposition and consequently the business map recommends that an action be taken to apply more price pressure, or get a new lower cost Component supplier (an alternative is that the management does not realize the value these Components are bringing to the Deliverable).

The example described with respect to FIG. 10 illustrates how the Business MAP may facilitate these types of assessments which were previously left up to the judgment of the Deliverable procurement team (who may have little or no idea what the value proposition of the Deliverable is), or (worse) the assessment may have been significantly influenced by a good Component sales team.

A slightly more complicated scenario is the reverse of the above situation. Components M, C, Z, X and D provide significant value for the Deliverable but are being pressured by the Deliverable procurement team to lower their costs. Of course, if the pressure is large enough the management of the Component supplying companies may escalate to the management of the Deliverable to get relief, but "all suppliers push back when asked to lower their prices", so their claims may be dismissed or ignored. The Business MAP and Value Proposition Ranking (VPR) would have alerted the Deliverable management team that the Component is key to the future Deliverable profitability. In the extreme case, the Component supplier may actually be forced by the behavior of the Deliverable procurement team to under invest themselves in the very value proposition that is needed to bring profit to the Deliverable, and may then begin a "death spiral" that inevitably leads to the loss of leadership in their value proposition or their business.

It is thus seen that, in both of the cases above, the Business MAP and the VPR would have told Deliverable management and their procurement teams what their key Components were and how important they were. This information would have certainly effected the Deliverable procurement decisions, especially if it was reinforced at regular intervals each time the Business MAP is run.

Additional tools are being developed to assist in quantifying end-user product (EUP) and component opportunity spaces and value propositions. One tool is the "Front-end Assessment" tool shown in FIG. 11 which comprises a chart 202 that facilitates the quantification (from a component viewpoint) of the attractiveness of a value proposition and the relative position the component is relative to EUP suppliers going after the market. That is, once an opportunity has been identified, the "Front-end Assessment" tool may help determine which Deliverable providers are positioned best to capitalize on it and where the Component supplier is relationship wise, to the leaders. The steps would include first identifying a customer value proposition; analyze the deliverable providers most likely to benefit and rank order them; assess the component supplier's existing relationship or relationship potential, and assess the participation outlook and create an action plan to enhance the value proposition/ cost.

There are many analysis and planning processes, however, many of them require significant judgment and proprietary information to operate effectively. The Business MAP requires only ASP data which is readily available in the public domain and no judgment on actions. It can be applied to any end-user product and key component: hardware, software, or services. The effectiveness of the process is only depend on the duration and of the trend period.

It should be understood that the trend data utilized according to the principles of the invention may be obtained from industry analysts or inter-company sources via conventional means such as a communications network, and may be stored in a conventional computer database or like storage medium. The BMAP algorithms and processes described may be embodied as one or more software programs executable by a conventional computing device. Preferably, such a computing device would implement conventional graphic user interface (GUI) functionality, e.g., Windows based, Lotus 1-2-3, capable of presenting the BMAP/BMAP analysis data in an efficient and intuitive manner, such as shown in the figures.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A method for analyzing a business that provides deliverable end-user products to consumers, said end-user products including components wherein each deliverable product and each component have a perceivable cost and consumer value, said method comprising the steps of:
  a) obtaining Average Sales Price (ASP) trend data for a deliverable end-user product provided by said business and tracking changes of said trend data over a period of time, said period divided into one or more time intervals;
  b) obtaining ASP trend data for a component used in said deliverable end-user product and tracking changes of said trend data for said component over said period of time,
  c) generating a data structure including elements for characterizing trend data as meeting certain performance criteria;
  d) mapping said trend changes associated with trend data for a deliverable end-user product and trend data for a component used in said deliverable end-user product for each period to said elements in said data structure; and,
  e) performing analysis of said elements for a component and deliverable product in each time interval, said elements indicating potential corrective action with respect to a value or cost for said component or deliverable product,
  wherein said data structure includes a matrix for characterizing relationships between ASP trends of deliverables and ASP trends of components, one or more elements of said matrix characterizing at least one of said deliverable and component ASP trends as being equal to or above a base level between successive time intervals,
  wherein said base level is zero, one or more elements characterizing said trends as being equal to or above said base level thereby defining a stability sector, and
  wherein one or more elements of said matrix characterizes at least one of said deliverable and component ASP trends as being below a base level while remaining flat, increasing or decreasing between successive time intervals.

2. The method according to claim 1, wherein elements of said matrix provide an estimation of profit potential for a business operating at an indicated time interval in said stability sector by managing the cost or value for that deliverable and component.

3. The method according to claim 2, wherein said step e) of performing an analysis includes the steps of:
  improving a value of the deliverable and identifying components that assist in said improving; and
  maintaining the value of said deliverable in said stability sector pending improvement of said value.

4. The method according to claim 1, further including repeating step b) though step e) utilizing a different component, said analysis revealing which component drives value and what customers perceive as value from the deliverable.

5. A method for assessing in real-time a business plan for a business that provides deliverable end-user products to consumers, said end-user products including components wherein each deliverable product and each component have a perceivable cost and consumer value, said method comprising the steps of:

a) providing a business plan associated with the selling of a deliverable product in the market, said plan organized as a series of successive time intervals, with each said interval indicating hypothetical movement of profitability of said deliverable product;

b) generating a data structure including elements for characterizing trend data as meeting certain performance criteria, each said element indicating one or more corrective actions that may be performed with respect to a value or cost for a deliverable or one of its components;

c) obtaining actual ASP trend data for said deliverable and component at a current sampling interval and mapping said actual ASP trend data for said deliverable and component to a corresponding element in said data structure;

d) comparing said mapped element with a hypothetical movement defined for the deliverable product and component according to said business plan at the current sampling interval; and e) making corrective changes with respect to a value or cost for said component or deliverable according to the comparison, wherein said data structure includes a matrix for characterizing relationships between ASP trends of deliverables and ASP trends of components, as being equal to or above a base level between successive time intervals, as being below a base level while remaining flat, increasing or decreasing between successive time intervals.

6. The method according to claim 5, wherein said step c) further comprises the step of: defining for said business plan a hypothetical Average Sales Price (ASP) trend for each said deliverable product and a component in each successive time interval, and wherein said step d) further includes comparing said actual ASP trend data with said hypothetical Average Sales Price (ASP) trend at said time interval.

7. The method according to claim 5, wherein said step c) of obtaining actual data is performed when valid ASP trend data is available.

8. A program storage device readable by a machine, tangibly embodying a program of instructions executable by the machine to perform method steps for analyzing a business that provides deliverable end-user products to consumers, said end-user products including components wherein each deliverable product and each component have a perceivable cost and consumer value, said method steps comprising:

a) obtaining Average Sales Price (ASP) trend data for a deliverable end-user product provided by said business and tracking changes of said trend data over a period of time, said period divided into one or more time intervals;

b) obtaining ASP trend data for a component used in said deliverable end-user product and tracking changes of said trend data for said component over said period of time, c) generating a data structure including elements for characterizing trend data as meeting certain performance criteria;

d) mapping said trend changes associated with trend data for a deliverable end-user product and trend data for a component used in said deliverable end-user product for each period to said elements in said data structure; and, e) performing analysis of said elements for a component and deliverable product in each time interval, said elements indicating potential corrective action with respect to a value or cost for said component or deliverable product, wherein said data structure includes a matrix for characterizing relationships between ASP trends of deliverables and ASP trends of components, one or more elements of said matrix characterizing at least one of said deliverable and component ASP trends as being equal to or above a base level between successive time intervals, wherein said base level is zero, one or more elements characterizing said trends as being equal to or above said base level thereby defining a stability sector, and wherein one or more elements of said matrix characterizes at least one of said deliverable and component ASP trends as being below a base level while remaining flat, increasing or decreasing between successive time intervals.

9. A program storage device readable by a machine, tangibly embodying a program of instructions executable by the machine to perform method steps for assessing in real-time a business plan for a business that provides deliverable end-user products to consumers, said end-user products including components wherein each deliverable product and each component have a perceivable cost and consumer value, said method steps comprising:

a) providing a business plan associated with the selling of a deliverable product in the market, said plan organized as a series of successive time intervals, with each said interval indicating hypothetical movement of profitability of said deliverable product;

b) generating a data structure including elements for characterizing trend data as meeting certain performance criteria, each said element indicating one or more potential corrective actions with respect to a value or cost for a deliverable or one of its components;

c) obtaining actual ASP trend data for said deliverable and component at a current sampling interval and mapping said actual ASP trend data for said deliverable and component to a corresponding element in said data structure;

d) comparing said mapped element with a hypothetical movement defined for the deliverable product and component according to said business plan at the current sampling interval; and e) making corrective changes with respect to a value or cost for said component or deliverable according to the comparison, wherein said data structure includes a matrix for characterizing relationships between ASP trends of deliverables and ASP trends of components, as being equal to or above a base level between successive time intervals, as being below a base level while remaining flat, increasing or decreasing between successive time intervals.

\* \* \* \* \*